United States Patent
Sun et al.

(10) Patent No.: US 12,094,084 B2
(45) Date of Patent: Sep. 17, 2024

(54) MULTI-CHANNEL FEATURE MAP FUSION

(71) Applicant: UBTECH ROBOTICS CORP LTD, Shenzhen (CN)

(72) Inventors: Bin Sun, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 376 days.

(21) Appl. No.: 17/388,043

(22) Filed: Jul. 29, 2021

(65) Prior Publication Data

US 2022/0044370 A1 Feb. 10, 2022

Related U.S. Application Data

(63) Continuation of application No. PCT/CN2020/140923, filed on Dec. 29, 2020.

(30) Foreign Application Priority Data

Aug. 5, 2020 (CN) .......................... 202010775325.2

(51) Int. Cl.
*G06T 5/20* (2006.01)
*G06F 7/24* (2006.01)
*G06T 5/50* (2006.01)

(52) U.S. Cl.
CPC .................. *G06T 5/20* (2013.01); *G06F 7/24* (2013.01); *G06T 5/50* (2013.01); *G06T 2207/20021* (2013.01); *G06T 2207/20221* (2013.01)

(58) Field of Classification Search
CPC ..... G06F 7/24; G06T 5/20; G06T 5/50; G06T 2207/20021; G06T 2207/20221; G06V 10/82; G06V 10/80–10/811
See application file for complete search history.

(56) References Cited

U.S. PATENT DOCUMENTS

2022/0086410 A1* 3/2022 Meng ........................ G06T 7/90

FOREIGN PATENT DOCUMENTS

| CN | 108304920 A | * | 7/2018 | ........... G06K 9/6268 |
| CN | 111161195 A | * | 5/2020 | ........... G06T 3/4038 |

OTHER PUBLICATIONS

Howard, A. G., Zhu, M., Chen, B., Kalenichenko, D., Wang, W., Weyand, T., . . . & Adam, H. (2017). Mobilenets: Efficient convolutional neural networks for mobile vision applications. arXiv preprint arXiv:1704.04861. (Year: 2017).*

* cited by examiner

*Primary Examiner* — Andrae S Allison
*Assistant Examiner* — Emmanuel Silva-Avina (57) ABSTRACT

Image processing methods are provided. One of the method includes: obtaining a to-be-processed multi-channel feature maps; obtaining multi-channel first output feature maps and multi-channel second output feature maps by processing the multi-channel feature maps through a parallel pointwise convolution and non-pointwise operation, where the non-pointwise convolution is for describing a spatial feature of each channel and an information exchange between the feature maps; and fusing the multi-channel first output feature maps and the multi-channel second output feature maps to obtain a multi-channel third output feature map.

3 Claims, 9 Drawing Sheets

(a) Lightweight exchange unit
(b) Lightweight basic unit
(c) Lightweight residual unit

MULTI-CHANNEL FEATURE MAP FUSION

CROSS REFERENCE TO RELATED APPLICATIONS

The present application is a continuation-application of International Application PCT/CN2020/140923, with an international filing date of Dec. 29, 2020, which claims foreign priority of Chinese Patent Application No. 202010775325.2, filed on Aug. 5, 2020 in the State Intellectual Property Office of China, the contents of all of which are hereby incorporated by reference.

BACKGROUND

1. Technical Field

The present disclosure relates to image processing technology, and particularly to image processing methods.

2. Description of Related Art

With the development of deep learning, neural networks have used in more and more industries to obtain image features by obtaining feature maps based on images, and then the mage features are used to perform action recognition, face recognition, and the like. Hence, it can be seen that if the obtained feature maps as the output are poor in expressing the features of images, the subsequent recognition results will be poor, too. Therefore, it has become an urgent technical problem to be solved by those skilled in the art that how to improve the feature expression of the feature maps as the output.

BRIEF DESCRIPTION OF THE DRAWINGS

To describe the technical schemes in the embodiments of the present disclosure or in the prior art more clearly, the following briefly introduces the drawings required for describing the embodiments. It should be understood that, the drawings in the following description merely show some embodiments. For those skilled in the art, other drawings can be obtained according to the drawings without creative efforts.

DETAILED DESCRIPTION

In order to make the objects, technical solutions and advantages of the embodiments of the present disclosure more clear, the technical solutions of the present disclosure will be clearly and completely described below with reference to the drawings. Apparently, the described embodiments are part of the embodiments of the present disclosure, not all of the embodiments. The components in the embodiments of the present disclosure that are described and shown in the drawings herein may be arranged and designed in various different configurations.

Therefore, the following detailed description of the embodiments and the related drawings are not intended to limit the scope of the present disclosure, but merely represents the embodiments. All other embodiments obtained by those skilled in the art based on the embodiments without creative efforts are within the scope of the present disclosure.

In should be noted that, the terms "first", "second", and the like are only for distinguishing one entity or operation from another, and do not require or imply that there is any such actual relationship or order between these entities or operations. Moreover, the terms "include", "comprise" or any other variants thereof are intended to cover non-exclusive inclusion, so that a process, method, article or device including a series of elements not only includes those elements, but also includes those that are not explicitly listed, or also include the elements inherent to the process, method, article or device. In the case that there is no extra restriction, the element defined by the sentence "including a . . . " does not exclude other identical elements in the process, method, article or device that includes the element.

It should be noted that, in the case of no conflict, the features in the embodiments can be combined with each other.

Figure 1:
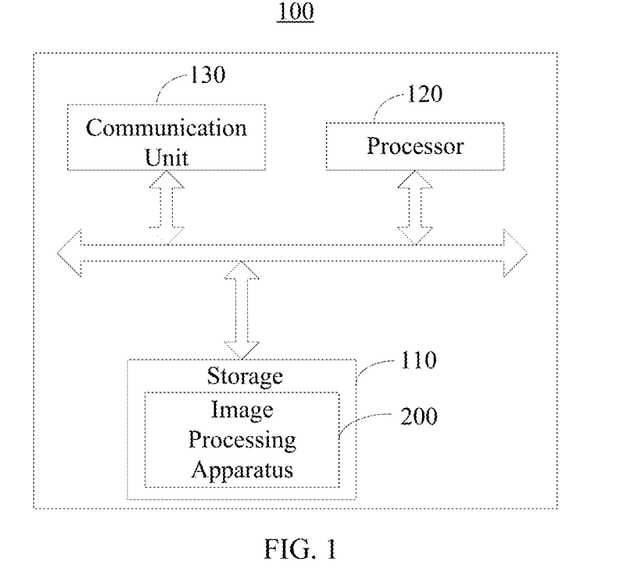
FIG. 1 is a schematic block diagram of an electronic device according to an embodiment of the present disclosure.

FIG. 1 is a schematic block diagram of an electronic device 100 according to an embodiment of the present disclosure. As shown in FIG. 1, in this embodiment, the electronic device 100 may be a desktop computer, a tablet computer, a server, and the like. The electronic device 100 may include a storage 110, a processor 120, and a communication unit 130. The storage 110, the processor 120, and the communication unit 130 are directly or indirectly electrically connected to each other to realize data transmission or interaction. For example, these components can be electrically connected to each other through one or more communication buses or signal lines.

In which, the storage 110 is configured to store programs or data. The storage 110 may include one or more of a random access memory (RAM), a read only memory (ROM), a programmable read-only memory (PROM), an erasable programmable read-only Memory (EPROM), electric erasable programmable read-only memory (EEPROM), and the like.

The processor 120 is configured to read/write data or programs stored in the storage 110 and execute corresponding functions. For example, an image processing apparatus 200 is stored in the storage 110, which includes at least one software functional module that can be stored in the storage 110 in the form of software or firmware. The processor 120 executes various functional applications and data processing, that is, implements an image processing method, by executing programs and modules stored in the storage 110 such as the image processing apparatus 200.

The communication unit 130 is configured to establish communication connections between the electronic device 100 and other communication terminals through a network, and is configured to send and receive data through the network.

It should be noted that, FIG. 1 only shows the structure of the electronic device 100, and the electronic device 100 may further include more or fewer components than those shown in FIG. 1 or have different configuration therewith. The components shown in FIG. 1 can be implemented by hardware, software, or a combination thereof.

Figure 2:
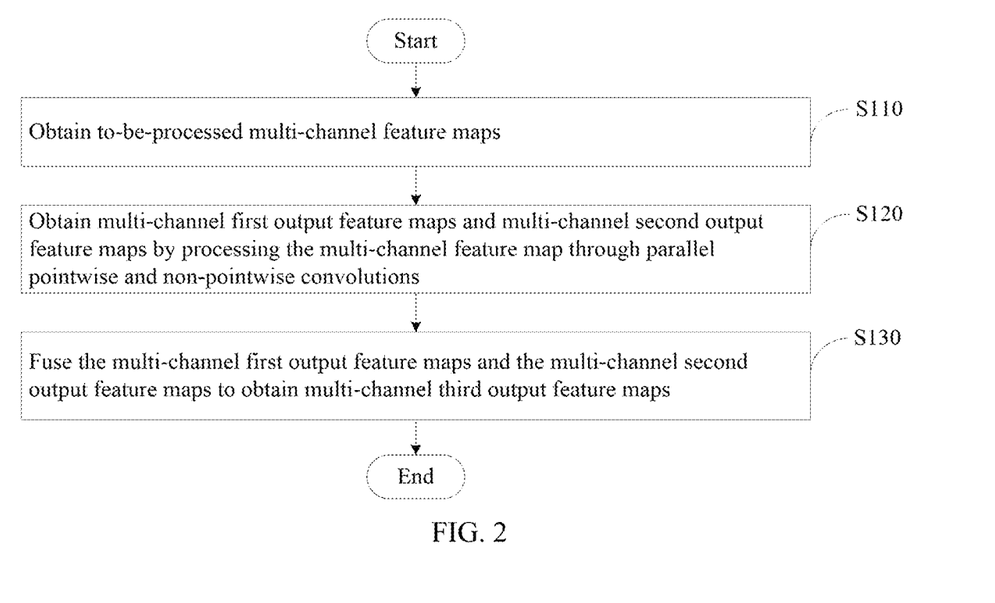
FIG. 2 is a flow chart of an image processing method according to an embodiment of the present disclosure.

FIG. 2 is a flow chart of an image processing method according to an embodiment of the present disclosure. The method may be implemented through the electronic device 100 shown in FIG. 1 or an image processing apparatus shown in FIG. 6. As shown in FIG. 2, the method includes the following steps.

S110: obtaining to-be-processed multi-channel feature maps.

In which, each of the multi-channel feature maps corresponding to a channel;

S120: obtaining multi-channel first output feature maps and multi-channel second output feature maps by processing the multi-channel feature map through a pointwise convolution and a non-pointwise convolution that are performed in parallel, respectively.

In which, the non-pointwise convolution is for describing spatial feature(s) of each channel and an information exchange between the channel feature maps.

S130: fusing the multi-channel first output feature maps and the multi-channel second output feature maps to obtain multi-channel third output feature maps.

In this embodiment, after the to-be-processed multi-channel feature maps are obtained, the multi-channel feature maps we processed by the pointwise convolution to obtain the multi-channel first output feature maps, and processed by the non-pointwise convolution performed in parallel with the pointwise convolution to obtain the multi-channel second output feature maps. In which, the multi-channel first output feature maps are obtained through the pointwise convolution, and the multi-channel second output feature maps are obtained through the non-pointwise convolution. That is, the multi-channel first output feature maps are obtained by processing the multi-channel feature maps through the pointwise convolution, and the multi-channel second output feature maps are obtained by processing the multi-channel feature maps through the non-pointwise convolution, where the pointwise convolution and the non-pointwise convolution are performed in parallel. Finally, the obtained multi-channel first output feature maps and multi-channel second output feature maps are fused to obtain the multi-channel third output feature maps.

In the process of obtaining the multi-channel third output feature maps, the pointwise convolution is used to describe the feature of each point and an information exchange between input channels, and the non-pointwise convolution is used to describe the spatial features of each input channel and the information exchange between several inputted feature maps. That is, the obtained third output feature maps not only involves the spatial features of each channel in the multi-channel feature map and the information exchange between the channel feature maps, but also involves the features of each point in the multi-channel feature map and the information exchange between the channels. At the same time, the above-mentioned two kinds of convolutions are performed in a parallel manner. As a result, the obtained multi-channel third output feature map contains relatively more feature information, thereby improving the feature expression of the feature maps as the output, which avoids the problem that effective information is not extracted as a feature due to only considering a certain aspect of information, while the time to obtain the multi-channel third output feature map will not be delayed.

For example, if the to-be-processed multi-channel feature maps are only processed through the non-pointwise convolution, and the results of processing is used as the multi-channel third output feature maps, while the non-pointwise convolution is for describing the spatial features of each input channel and the information exchange between several inputted feature maps, then the features of each point in the feature map of each channel in the multi-channel feature maps and the information exchange between the input channels will be ignored. However, the ignored information that is considered as redundant information can be used to have a better understanding of the to-be-processed multi-channel feature maps. Therefore, the method can improve the feature expression of the multi-channel third output feature maps for the to-be-processed multi-channel feature maps.

In this embodiment, the multi-channel feature maps may be obtained through receiving the multi-channel feature maps sent by other devices, or through processing input images.

Figure 3:
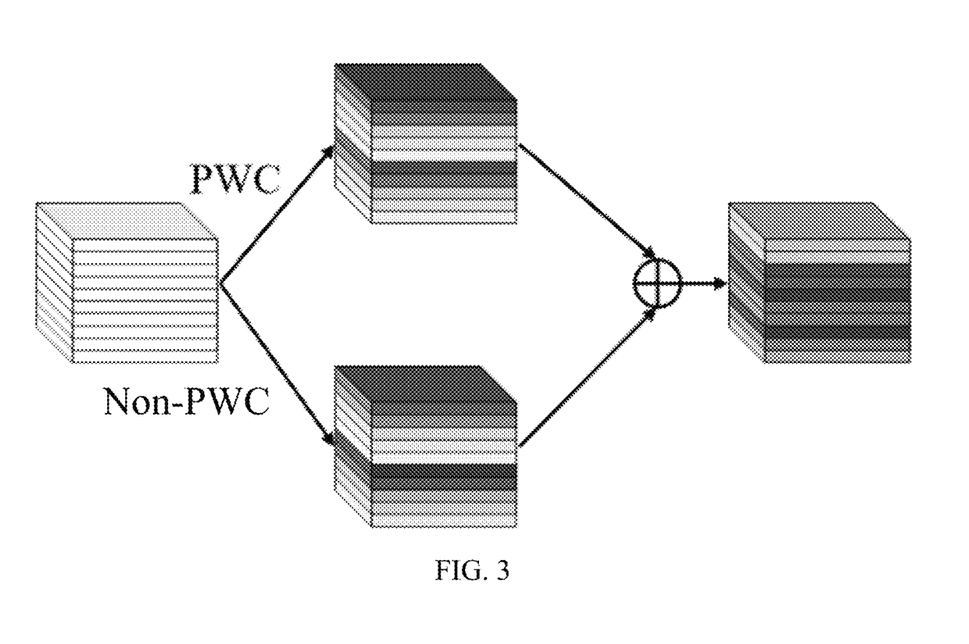
FIG. 3 is a schematic diagram of example 1 of processing multi-channel feature maps according to the embodiment of the FIG. 2.

FIG. 3 is a schematic diagram of example 1 of processing multi-channel feature maps according to the embodiment of the FIG. 2. As shown in FIG. 3, PWC represents pointwise convolution, and non-PWC represents non-pointwise convolution. In an example, the multi-channel first output feature maps, the multi-channel second output feature maps, and the multi-channel third output feature maps can be obtained in the following manner.

After obtaining the multi-channel feature maps, the pointwise convolution is performed on the multi-channel feature maps to obtain the multi-channel first output feature maps, and the non-pointwise convolution is also performed on the multi-channel feature maps to obtain the multi-channel second output feature maps. That is, the objects of the pointwise convolution and the non-pointwise convolution are exactly the same. Then, an accumulation operation is performed on the multi-channel first output feature maps and the multi-channel second output feature maps, that is, an "add" processing is performed, so as to obtain the multi-channel third output feature map In which, the above-mentioned accumulation operation refers to perform an addition operation on the same pixel of a plurality of outputted feature maps. For example, if feature map A1 in the multi-channel first output feature maps corresponds to feature maps 1-3 in the multi-channel feature maps, and feature map B in the multi-channel second output feature maps also corresponds to feature maps 1-3 in the multi-channel feature maps, the same pixels of the feature map A1 and the feature map B1 are accumulated to implement the fusion of feature map A1 and feature map B1, then the fused feature map is the third output feature map of a channel.

Figure 4:
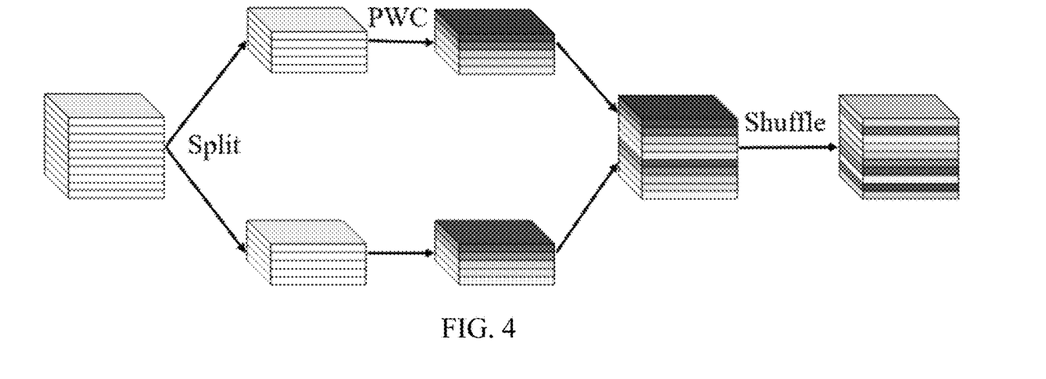
FIG. 4 is a schematic diagram of example 2 of processing multi-channel feature maps according to the embodiment of the FIG. 2.

FIG. 4 is a schematic diagram of example 2 of processing multi-channel feature maps according to the embodiment of the FIG. 2. As shown in FIG. 4, "Split" represents grouping, and "Shuffle" represents reorganization. In another example of this embodiment, the multi-channel first output feature maps, the multi-channel second output feature maps, and the multi-channel third output feature maps can be obtained in the following manner.

The multi-channel feature maps are divided by channel into a first part of the multi-channel feature maps and a second part of the multi-channel feature maps. The amount of feature maps included in the first part of the multi-channel feature maps and that in the second part of the multi-channel feature maps may be the same or different, that is, the multi-channel feature maps may be evenly or unevenly divided by channel. In the case of evenly divided, it means that the multi-channel feature maps are evenly divided by channel into the first part of the multi-channel feature maps and the second part of the multi-channel feature maps.

As an example, when the multi-channel feature maps are obtained, the obtained multi-channel feature maps are divided into two parts as the first part of the multi-channel feature maps and the second part of the multi-channel feature maps. As another example, the multi-channel feature maps is divided into two parts after obtaining the multi-channel feature maps and before performing the pointwise convolution and non-pointwise operation, so as to obtain the first part of the multi-channel feature maps and the second part of the multi-channel feature maps. The multi-channel feature maps may be divided into the first part of the multi-channel feature maps and the second part of the multi-channel feature maps through a preset channel division operator.

The pointwise convolution is performed on the first part of the multi-channel feature maps to obtain the multi-channel first output feature maps, and the non-pointwise convolution is performed on the second part of the multi-channel feature maps to obtain the multi-channel second output feature maps. That is, the objects of pointwise convolution and the non-pointwise convolution are different. Then, a channel reorganization is performed on the multi-channel first output feature maps and the multi-channel second output feature maps to obtain the multi-channel third output feature map.

In which, after obtaining the multi-channel first output feature maps and the multi-channel second output feature maps, the channels of the multi-channel first output feature maps and the multi-channel second output feature maps can be combined through "Concat" method, and then perform "Shuffle" processing, that is, performing channel shuffling processing, thereby obtaining the multi-channel third output feature maps.

As an example, the non-pointwise convolution may be any of a deep convolution, a group convolution, an extended convolution, a deconvolution, and a standard convolution with a convolution kernel of 1×1 size among conventional convolutions.

In this embodiment, the non-pointwise convolution may be an adaptive linear operation. When the adaptive linear operation is used, the multi-channel second output feature maps can be obtained by: grouping the multiple channel feature maps by channel according to the channel amount of the channel feature maps to perform the non-pointwise convolution and that of the multi-channel second output feature maps, and obtaining the multi-channel second output feature maps by performing a linear operation on each feature map group.

In which, the multi-channel feature maps to perform the non-pointwise convolution are determined by the object of the non-pointwise convolution. As shown in FIG. 3, in the case that the objects of the pointwise convolution and the non-pointwise convolution are completely the same, the channel feature maps are the multi-channel feature maps to be processed. As shown in FIG. 4, in the case that the objects of the pointwise convolution and the non-pointwise convolution are different, the channel feature maps are the second part of the multi-channel feature maps.

In the adaptive linear operation, the first ratio and the second ratio can be obtained first, and determine whether the first ratio or the second ratio is a positive integer, and then grouping the channel feature maps by channel dimension according to the ratio of positive integer. In which, the first ratio is the ratio of the channel amount of the channel feature maps to that of the multi-channel second output feature maps, and the second ratio is the ratio of the channel amount of the multi-channel second output feature maps and that of the channel feature maps.

In one example of this embodiment, if the first ratio is a positive integer, the multi-channel feature maps may be evenly divided into the feature map groups by channel according to the first ratio. Where, the amount of the feature maps in each feature map group is the first ratio. Then, for each feature map group, the linear calculation is performed on the feature map corresponding to each channel in the feature map group, and the cumulative sum of the linear calculation result of the feature map group is used as a second output feature map corresponding to the feature map group.

The above-mentioned calculation can be expressed by an equation of:

$$Y_{[i]} = \Phi_i(X_{[(i\alpha):(i\alpha+\alpha-1)]}), \text{ if } C_i/C_o = \alpha \quad (1)$$

where, $\alpha=1, 2 \ldots, N_1$, $i=1, 2, \ldots$, and X represents the channel feature maps to perform the non-pointwise convolution, $XV_{[1]}$ represents the feature map of the i-th channel in the to-be-processed multi-channel feature maps, Y represents the second output feature maps, $Y_{[i]}$ represents the second output feature maps of the i-th channel, $\Phi_i$ represents the linear operation corresponding to the second output feature map of each channel, $C_1$ represents the channel amount of the to-be-processed multi-channel feature maps, and $C_o$ represents the channel amount of the multi-channel second output feature maps. For the forgoing equation, it can be understood that X represents the input feature map, Y represents the output feature map, $C_i$ represents the amount of input channels, and $C_o$ represents the amount of output channels.

If the first ratio is a positive integer, that is, when the ratio of the channel amount of the channel feature maps to that of the multi-channel second output feature maps is a positive integer, the linear calculation is performed on each of the $\alpha$ channel feature maps in the channel feature maps based on $\Phi_i$ and the sum of the result of the linear calculation is used as the second output feature map $Y_{[i]}$ of the i-th channel. In which, the second output feature maps $Y_{[i]}$ are obtained by processing the $\alpha$ channel feature maps in the channel feature maps.

The above-mentioned linear operation may be implemented by affine transformation, wavelet transformation, and the like. In addition, convolution is an efficient operation that has been well supported by existing hardware and can cover many widely used linear operations. Therefore, deep separable convolution can also be used to implement the above-mentioned linear operation, that is, the above-mentioned adaptive linear operation may be an adaptive convolution (AC).

The following takes a linear operation implemented through depth separable convolution as an example to illustrate the calculation using the foregoing equation.

Assume that the channel feature maps are $X_1$~$X_{12}$ and the multi-channel second output feature maps are, $Y_1$~$Y_6$, there are 6 convolution kernels $\Phi_1$~$\Phi_6$. The ratio of the channel amount of the channel feature maps to that of the multi-channel second output feature maps is 2.

According to the ratio of 2, the channel feature maps are divided by channel into 6 feature map groups including $X_1$-$X_2$, $X_3$-$X_4$, $X_5$-$X_6$, $X_7$-$X_8$, $X_9$-$X_{10}$, and $X_{11}$-$X_{12}$. Each feature map group includes 2 channel feature maps.

After the feature maps $X_1$-$X_2$, are calculated based on the convolution kernel $\Phi_j$, respectively, two calculation result maps can be obtained, and the cumulative sum of the two calculation result maps is used as the second output feature map $Y_1$ corresponding to the feature maps $X_1$-$X_2$. Based on the feature maps $X_3$-$X_4$ and the convolution kernel $\Phi_2$, the second output feature maps $Y_2$ corresponding to the feature maps $X_3$-$X_4$ can be calculated in the same way. Similarly, the second output feature maps $Y_3$-$Y_6$ can also be calculated. In this manner, the multi-channel second output feature maps $Y_1$-$Y_6$ can be obtained.

In another example of this embodiment, if the second ratio is a positive integer, the multi-channel feature maps can be evenly divided into a plurality of feature map groups by channel. In which, the amount of the feature map in each feature map group is 1. For each feature map group, a plurality of f linear operations are performed on the feature map in the feature map group, and the results of the linear operations corresponding to the feature map are used as the second output feature maps of the channels corresponding to the feature map. In which, the number of times of performing linear operations on the feature map in one feature map group is the second ratio.

The above-mentioned calculation can be expressed by an equation of:

$$Y_{[i\alpha:(i\alpha+\alpha-1)]}=\Phi_i(X_{[i]}), \text{ if } C_o/C_i=\alpha \quad (2)$$

For the description of the parameters in this equation, refer to the description of the parameters in equation (1).

If the second ratio is a positive integer, that is, when the ratio of the channel amount of the multi-channel second output feature maps to that of the channel feature maps is a positive integer, $\alpha$ times of the linear calculation is performed on each channel feature map in the channel feature maps based on $\Phi_i$, thereby generating a second output feature maps for each channel feature map.

As an example, the above-mentioned linear operation may be implemented by affine transformation, wavelet transformation, or the like. In addition, depth separable convolution may also be used to implement the above-mentioned linear operation.

For a standard convolutional layer, assume that the size of the input feature map is $H_i \times W_i \times C_i$, where $H_i$ represents the height of the input feature map, ii represents the width of the input feature map, and $C_i$ is the amount of input channels. Assume that the size of the output channel feature map is $H_o \times W_o \times C_o$, where $H_o$ represents the height of the output feature map, $W_o$ represents the width of the output feature map, and $C_o$ represents the amount of output channels. In this way, the size of each convolution kernel is $K \times K \times C_i$. Therefore, the total computational overhead, for example, that is, floating-point operations per second (FLOPs) is:

$$\text{FLOPs(Standard)}=H_o \times W_o \times K \times K \times C_i \times C_o \quad (3)$$

Convolutions such as deep convolution and group convolution can effectively reduce FLOPs. In which, group convolution is to divide the inputted feature maps into groups, and then convolve each group, respectively. However, this convolution needs to set a grouping parameter G. If different convolutional layers use the same parameter G, for feature maps with more channels, there will be more channels in each group, which may result in lower convolution efficiency for each group. If the amount of groups is equal to the amount of input channels, and the amount of output channels is equal to that of the input channels, the group convolution becomes a deep convolution, and although FLOPs are further reduced, a point convolution will follow because deep convolution cannot change the amount of the channels, which will increase the delay.

Figure 5:
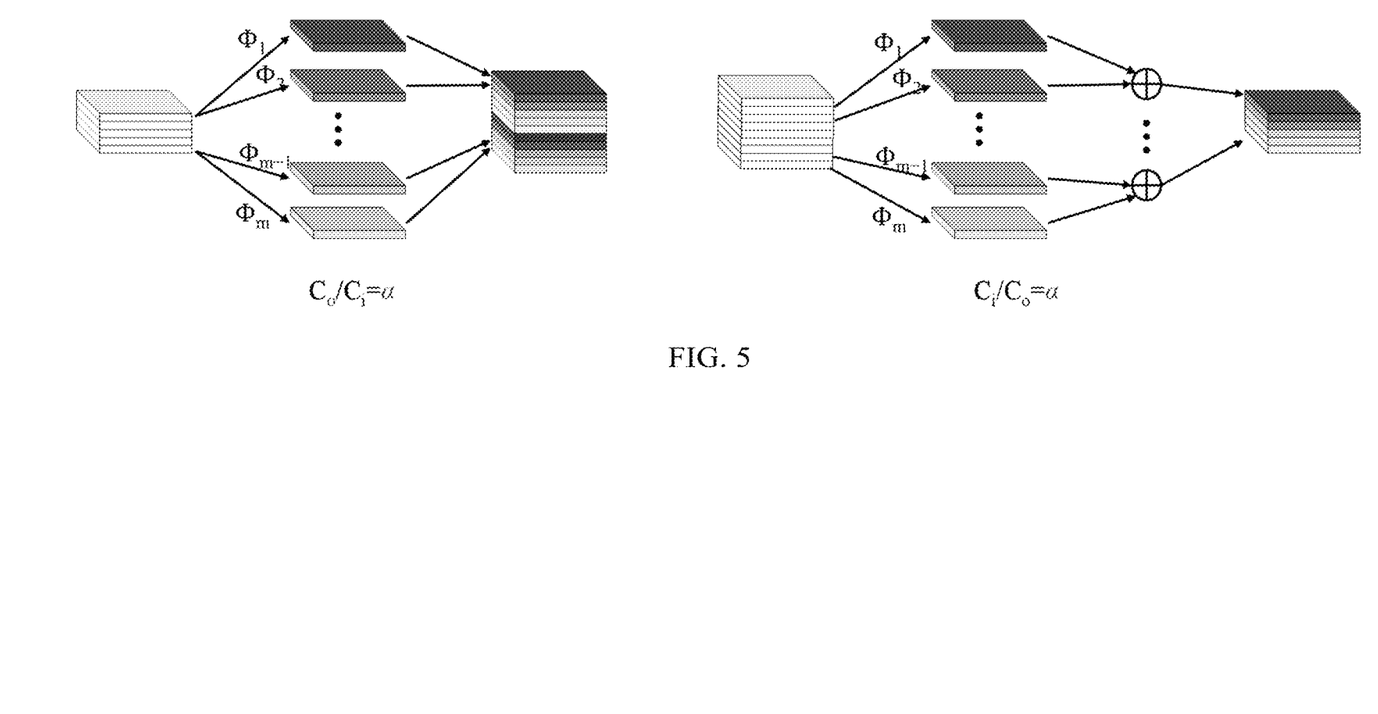
FIG. 5 is a schematic diagram of performing adaptive linear operation on channel feature maps to perform non-pointwise convolution according to the embodiment of the FIG. 2.

FIG. 5 is a schematic diagram of performing adaptive linear operation on channel feature maps to perform non-pointwise convolution according to the embodiment of the FIG. 2. As shown in FIG. 5, in this embodiment, the above-mentioned obtaining the multi-channel second output feature maps using the first ratio and the second ratio does not need manual setting the parameters of each layer like the ordinary grouped convolution, and does not require the amount of the input channels and that of the output channels to be the same like the deep convolution. Therefore, a plurality of feature maps can be adaptively generated from one feature map, and a plurality of feature maps can be adaptively merged into one feature map. In this manner, $C_i$ input feature maps can adaptively generate $C_o$ output feature maps. The calculation amount of adaptive convolution is:

$$H_o \times W_o \times K \times K \times C_i \times C_o/\min(C_i,C_o) \quad (4)$$

It can be seen that, by obtaining the multi-channel second output feature maps using the first ratio and the second ratio, the calculation amount can be reduced.

In the other example of this embodiment, if both the first ratio and the second ratio are not positive integers, that is, the first ratio which is the ratio of the channel amount of the multiple channel feature maps to that of the multi-channel second output feature maps as well as the second ratio which is the ratio of the channel amount of the multi-channel second output feature maps to that of the channels of the channel feature maps are not positive integers, the channel feature maps can also be grouped in the following manner, and then the multi-channel second output feature maps can be obtained by calculation.

Common divisors of the channel amount of the channel feature maps and that of the channels of the multi-channel second output feature maps are obtained. Then, one of the common divisors is used as a target common divisor. In some embodiments, any common divisor can be used as the target common divisor, or the greatest common divisor can be selected as the target common divisor. In other embodiments, the target common divisor may be selected in other manners. In this embodiment, the target common divisor is the greatest common divisor.

The multi-channel feature maps and the multi-channel second output feature maps are grouped by channel according to the target common divisor. In which, the amount of the feature maps in each feature map group is plural, and that of the second output feature maps in each second output feature map group is also plural. The amount of groups is the target common divisor. For each feature map group, a plurality times the linear operation is performed on the feature map group to obtain the second output feature map group corresponding to the feature map group.

For example, if the target common divisor is b, the channel feature maps and the multi-channel second output feature maps are grouped into b groups. The obtaining of the second output feature map group corresponding to a feature map group based on the feature map group is similar to the calculation after grouping in the group convolution. For example, when using convolution to implement the above-mentioned linear operation, a feature map group includes 4 feature maps, and a second output feature map group includes 3 second output feature maps, and a convolution kernel group corresponding to the feature map group includes convolution kernels 1, 2, and 3, then the second output feature map group corresponding to the feature map group can be obtained by: obtaining the 1st second output feature map based on convolution kernel 1 and the 4 feature maps in the feature map group, obtaining the 2nd second output feature map based on convolution kernel 2 and the 4 feature maps in the feature map group, and obtaining the 3rd second output feature map based on convolution kernel 3 and the 4 feature maps in the feature map group.

The adaptive linear operation can well describe the information exchange within the group, and can effectively reduce the amount of parameters and FLOPs. In this embodiment, since the redundant information in the feature map can help to have a better understanding of the input data, it also retains some redundant information in the feature map through pointwise convolution, so as to avoid the problem of lack of information communication between groups when only the adaptive linear operation isused. Therefore, the to-be-processed multi-channel feature maps are processed using the pointwise convolution and the non-pointwise convolution that are in parallel, thereby improving the feature expression of the obtained multi-channel third output feature map, while only a few FLOPs and parameters are used.

In which, the ratio of the calculation amount of obtaining the multi-channel third output feature map using the standard convolution to that using equation (4) is:

$$\frac{H_o \times W_o \times K \times K \times C_i \times C_o}{H_o \times W_o \times C_i \times C_o + H_o \times W_o \times K \times K \times C_i \times C_o/\min(C_i, C_o)} \quad (5)$$

If $K \ll \min(C_i, C_o)$, the ratio of the calculation amount of obtaining the multi-channel third output feature map using the standard convolution to that using equation (4) may also be expressed as:

$$\frac{H_o \times W_o \times K \times K \times C_i \times C_o}{H_o \times W_o \times C_i \times C_o + H_o \times W_o \times K \times K \times C_i \times C_o/\min(C_i, C_o)} = \quad (6)$$

$$\frac{K \times K}{1 + K \times K/\min(C_i, C_o)} = \frac{K \times K \times \min(C_i, C_o)}{\min(C_i, C_o) + K \times K} \approx K^2$$

It can be seen that, in this embodiment, the calculation amount and the parameters are reduced.

In this embodiment, in the case that the channel amount in the first part of the multi-channel feature maps is equal to that in the second part of the multi-channel feature maps and $K \ll \min(C_i, C_o)$, when obtaining the multi-channel third output feature maps through the adaptive convolution corresponding to equation (4) and the channel reorganization, the ratio of the calculation amount between the standard convolution and that in the forgoing calculation is:

$$\frac{H_o \times W_o \times K \times K \times C_i \times C_o}{H_o \times W_o \times C_i \times C_o/4 + H_o \times W_o \times K \times K \times C_i \times C_i \times C_o/4 \min(C_i, C_o)} = \quad (7)$$

$$\frac{4K \times K}{1 + K \times K/\min(C_i, C_o)} = \frac{4K \times K \times \min(C_i, C_o)}{\min(C_i, C_o) + K \times K} \approx 4K^2$$

In the case that the non-pointwise operation is the adaptive convolution corresponding to equation (4) and $K \ll \min(C_i, C_o)$, the ratio of the calculation amount of obtaining the multi-channel third output feature map without channel reorganization to that of obtaining the multi-channel third output feature map through evenly dividing the channels and channel reorganization is:

$$\frac{H_o \times W_o \times C_i \times C_o + H_o \times W_o \times K \times K \times C_i \times C_o/\min(C_i, C_o)}{H_o \times W_o \times C_i \times C_o/4 + H_o \times W_o \times K \times K \times C_i \times C_o/4 \min(C_i, C_o)} \quad (8)$$

It can be seen from equation (8) that, by obtaining the multi-channel third output feature map through channel reorganization, the speed of obtaining the multi-channel third output feature map can be increased. By comparing FIG. 3 and FIG. 4, it can be seen that FLOPs can be further reduced by replacing "Add" operation with "Split", "Concat" and "Shuffle" while maintaining the information exchange between the channels.

Figure 6:
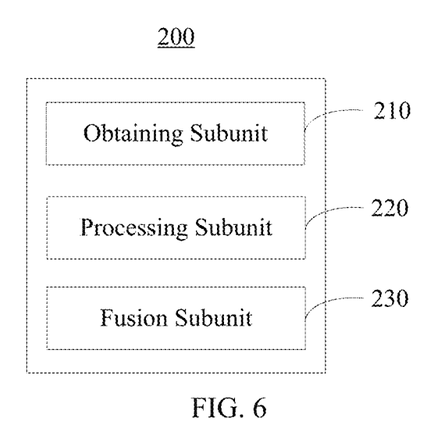
FIG. 6 is a schematic block diagram of an image processing apparatus according to an embodiment of the present disclosure.

In order to perform the corresponding steps in the above-mentioned embodiments, an example of an image processing apparatus 200 is provided below. FIG. 6 is a schematic block diagram of an image processing apparatus according to an embodiment of the present disclosure. In this embodiment, the image processing apparatus 200 may adopt the structure of the electronic device 100 in FIG. 1. It should be noted that, the basic principles and technical effects of the image processing apparatus 200 are the same as those of the above-mentioned embodiment. For a brief description, for parts not mentioned herein, the corresponding content in the above-mentioned embodiment may be referred to. The image processing apparatus 200 may be applied to the electronic device 100. The image processing apparatus 200 may easily replace a standard convolution unit without changing the network architecture. That is, the standard convolution or other convolution in the existing neural network structure can be replaced with the image processing apparatus 200. The image processing apparatus 200 have the characteristic of plug and play. As shown in FIG. 6, the image processing apparatus 200 may include an obtaining subunit 210, a processing subunit 220, and a fusion subunit 230.

The obtaining subunit 210 is configured to obtain to-be-processed multi-channel feature maps.

The processing subunit 220 is configured to obtaining multi-channel first output feature maps and a second output feature map by processing the multi-channel feature maps through a pointwise convolution and a non-pointwise operation convolution that are performed in parallel. In which, the non-pointwise convolution is for describing a spatial feature of each channel and an information exchange between the channel feature maps.

The fusion subunit 230 is configured to fuse the multi-channel first output feature maps and the multi-channel second output feature maps to obtain a multi-channel third output feature map.

In this embodiment, the above-mentioned subunits may be stored in the storage 110 in FIG. 1 in the form of software or firmware or solidified in the operating system (OS) of the electronic device 100, and can be executed by the processor 120. At the same time, the data, program and the like that are required to execute the above-mentioned subunits may be stored in the storage 110.

In the existing image processing system, models are generally used to process images. When deploying a model in actual applications, it is necessary to consider model parameters, floating-point operations, and latency. But the compression of the model will inevitably lead to a loss of accuracy. Therefore, how to balance the accuracy and efficiency of the model is an urgent problem to be solved.

To solve this problem, some methods such as quantification and pruning can be used to solve effectively. The quantization-based method can reduce the redundancy in the calculations. However, in the inference process, because the shared weights need to be restored to the original positions, the memory for executing cannot be saved. The pruning-based methods can reduce redundant connections in the pre-trained model, while finding the best performance requires a lot of works.

There are also methods that use efficient convolutions to design an efficient structure. AlexNet first proposed group convolution, which distributes the model on two OPUs (graphics processing units). As a special form, deep convolution was first proposed in Xception and has been well applied in MobileNet. Deep convolution requires the same input and output channels, so 1×1 convolution is usually added before or after the deep convolution layer. In this case, it is inevitable to decompose a convolutional layer into two or three layers in series. For example, in MobileNet, each layer is divided into two layers, deep convolution is used first, and then use point convolution. Although the method reduces the parameters and FLOPs, which will cause delay.

For the above-mentioned situation, an image processing system is further provided. The image processing system includes a network model including the image processing apparatus 200. The image processing apparatus 200 can adaptively obtain an output feature map of a desired size, and improve the feature expression of the output feature map without increasing delay, and also has the characteristics of being able to reduce FLOPs and the amount of parameters. As a result, the processing speed of the image processing system can be increased, while the quality of the processing results can be ensured. In which, the network model may be a posture estimation model or other models.

In this embodiment, the network model is a posture estimation model, and the posture estimation model includes a preprocessing network, a subject network, and a regressor that are connected in sequence. The preprocessing network is configured to preprocess the input image to obtain the input feature map. The subject network is configured to process the input feature map to obtain the output feature map. In which, the subject network includes a basic unit, an exchange unit, and a residual unit. In the exchange unit, at least one convolution unit among the convolution unit correspond to the part of the input and output feature maps with the same resolution, the convolution unit in the basic unit, and a convolution unit between two convolution units of the same size in the residual unit is the image processing apparatus 200. The regressor is configured to convert the output feature map into a position heat map, and determine the position of joint point according to the position heat map.

In this embodiment, the preprocessing network may be a "stem" composed of two convolution units for reducing resolution, which may reduce the resolution to ¼ of the input image. The input feature map and the output feature map of the main network have the same resolution. By adopting the image processing apparatus 200, the weight of the subject network can be reduced.

In this embodiment, the main network may be HRNet. A brief introduction to HRNet is given below. From the high-resolution branch of the first stage, HRNet maintains high-resolution representation throughout the entire process, and in each subsequent stage, a new branch is added to the current branch in parallel at ½ of the lowest resolution in the current branch.

Figure 7:
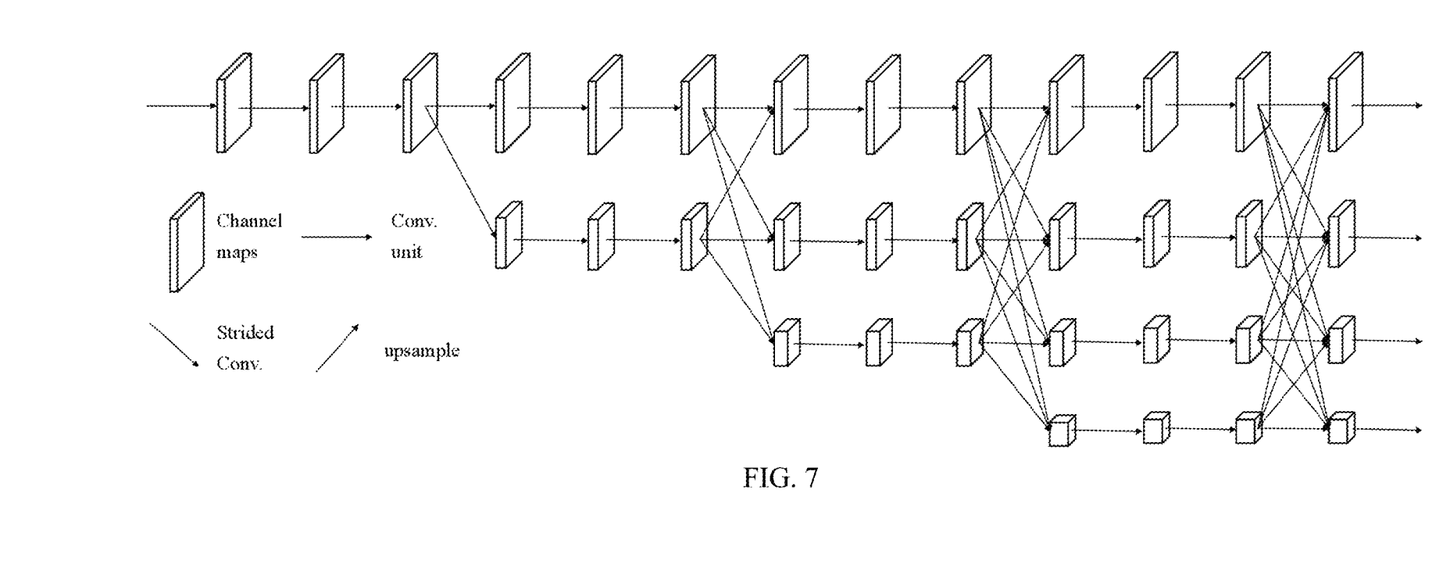
FIG. 7 is a schematic diagram of the structure of HRNet according to an embodiment of FIG. 6.

FIG. 7 is a schematic diagram of the structure of HRNet according to an embodiment of FIG. 6. As shown in FIG. 7, HRNet includes a total of four stages (i.e., the four areas in the network of FIG. 7 that are connected and have background colors). The first stage includes 4 residual units and 1 exchange unit. Each residual unit consists of a bottleneck with a width of 64 that is followed by a 3×3 convolution unit. The exchange unit will generate two branches, and one of which reduces the width of the feature map to 32, and the other of which reduces the resolution to ½ of the original.

Figure 8:
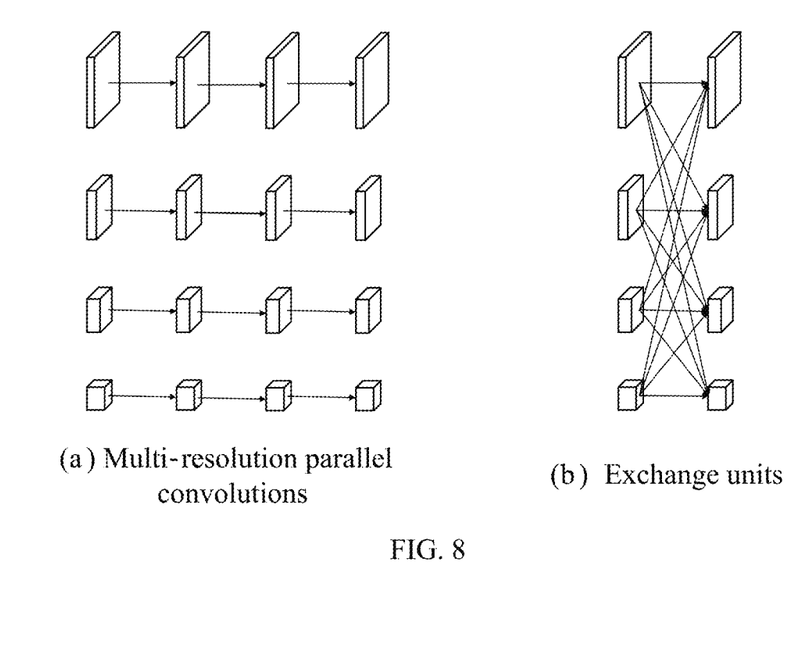
FIG. 8 is a schematic diagram of an example of a multi-resolution block in FIG. 7.

Each of the second, third and fourth stages consists of 4 parallel basic units and one exchange unit. The second, third, and fourth stages contain 1, 4, and 3 multi-resolution blocks, respectively. The multi-resolution blocks of the second, third, and fourth stages are taken as the second, third, and fourth resolution blocks, respectively. For simplicity of description, each node in FIG. 7 has only one multi-resolution block. Taking a four-resolution block as an example, which includes 4 branches each including 4 basic units (see part (a) of FIG. 8), and each basic unit includes two 3×3 convolution units. In addition, a cross-resolution exchange unit (see part (b) of FIG. 8) performs the information interaction of the four branches.

In this embodiment, in the above-mentioned pose estimation model, in the subject network of HRNet, the residual unit of the first stage, the basic unit of the second to fourth stages, and the relevant convolution unit in the exchange unit may all be the image processing apparatus 200.

Figure 9:
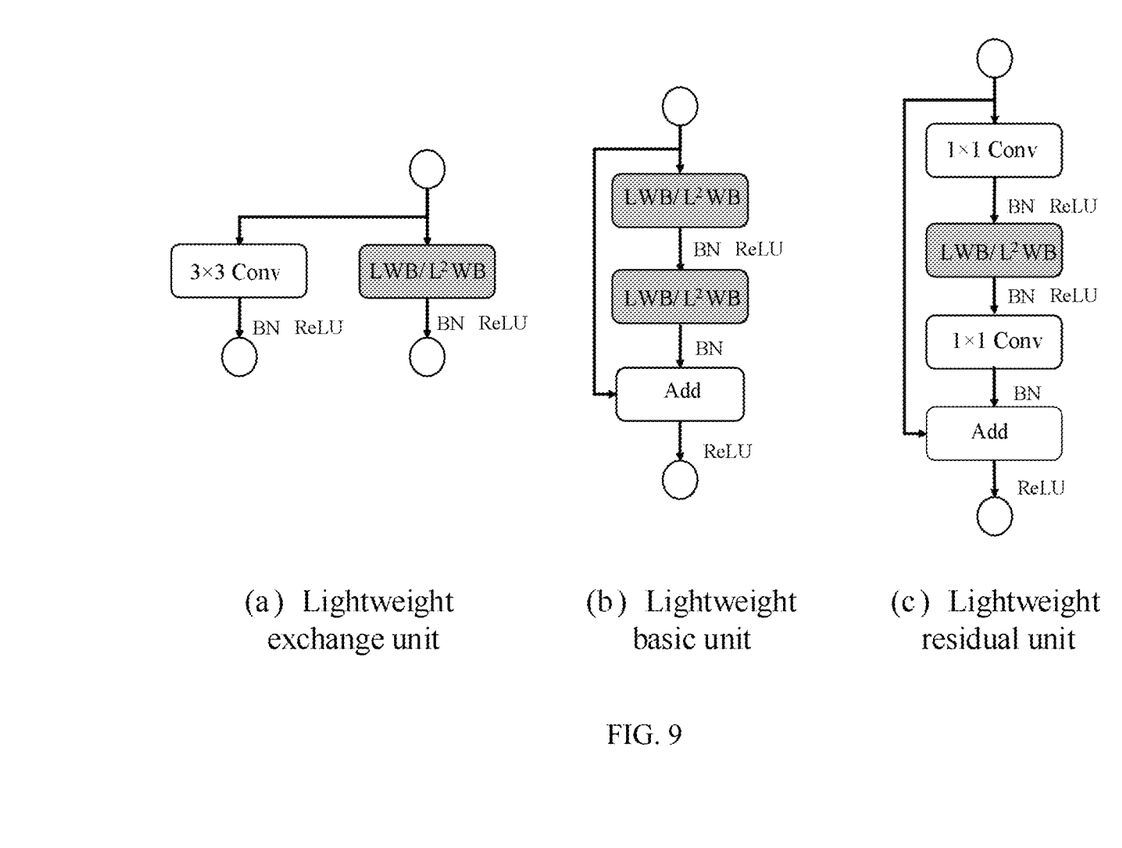
FIG. 9 is a schematic diagram of an exchange unit, a basic unit, and a residual unit in a pose estimation model according to the embodiment of FIG. 6.

FIG. 9 is a schematic diagram of an exchange unit, a basic unit, and a residual unit in a pose estimation model according to the embodiment of FIG. 6. As shown in FIG. 9, in this embodiment, the convolution unit (i.e., the dark gray part of part (a) of FIG. 9) of the part of the input and output feature maps with the same resolution is sets as the image processing apparatus 200, so that the posture estimation model includes a lightweight exchange unit. For the basic unit, two convolution units (i.e., the dark gray part of part (b) of FIG. 9) in the basic unit are set as the image processing apparatus 200, so that the posture estimation model includes a lightweight basic unit. For the residual unit, the convolution unit (i.e., the dark gray part of part (c) of FIG. 9) between two convolution units of the same size in the residual unit is set as the image processing apparatus 200, so that the pose estimation model includes a lightweight residual unit.

In this embodiment, the posture network model is a lightweight model. The posture network model can improve the efficiency of posture estimation and obtain comparable accuracy.

A non-transitory computer readable storage medium is further provided. The storage medium stores a computer program, and the computer program can be executed by a processor to implement the image processing method.

In summary, the embodiments of the present disclosure provide an image processing method as well as an apparatus and a system and an electronic device using the same, and a computer readable storage medium. After obtaining to-be-processed multi-channel feature maps, multi-channel first output feature maps and second output feature maps are obtained by processing the multi-channel feature maps through a parallel pointwise convolution and non-pointwise operation, then the obtained multi-channel first output feature maps and multi-channel second output feature maps are fused to obtain a multi-channel third output feature map. In which, the non-pointwise convolution is for describing a spatial feature of each channel and an information exchange between the channel feature maps. As a result, the obtained multi-channel third output feature map not only involves the spatial features of each channel in the multi-channel feature maps and the information exchange between the channel feature maps, but also involves the feature of each point in the multi-channel feature maps and the information exchange between the channels, so that the multi-channel third output feature maps contain relatively more feature information, which improves the feature expression of the feature maps as the output. At the same time, by using parallel computing, the delay in obtaining the multi-channel third output feature maps can be avoided.

The forgoing is only the specific embodiment of the present disclosure, while the scope of the present disclosure is not limited thereto. For those skilled in the art, modifications or replacements that can be easily conceived within the technical scope of the present disclosure should be included within the scope of the present disclosure. Therefore, the scope of the present disclosure should be determined in accordance with the scope of the claims.

What is claimed is:

1. An image processing method, comprising steps of:
    obtaining to-be-processed multi-channel feature maps, wherein each of the multi-channel feature maps corresponding to a channel;
    obtaining multi-channel first output feature maps by processing the multi-channel feature maps through a pointwise convolution and multi-channel second output feature maps by processing the multi-channel feature maps through a non-pointwise convolution, wherein the pointwise convolution and the non-pointwise convolution are performed in parallel, and the non-pointwise convolution is for describing a spatial feature of each channel and an information exchange between the channel feature maps; and
    fusing the multi-channel first output feature maps and the multi-channel second output feature maps to obtain multi-channel third output feature maps;
    wherein, the non-pointwise convolution is an adaptive linear operation, and in response to a first ratio of a channel amount corresponding to the channel feature maps to perform the non-pointwise convolution and a channel amount corresponding to the multi-channel second output feature maps being a positive integer, the multi-channel second output feature maps is obtained by:
        evenly dividing the channel feature maps into a plurality of feature map groups by channel according to the first ratio, wherein an amount of the feature maps in each feature map group is the first ratio; and
        performing the linear operation on the feature map corresponding to each channel in each feature map group, and using a cumulative sum of results of the linear operations of the feature map group as the second output feature maps corresponding to the feature map group.

2. The method of claim 1, wherein the obtaining the multi-channel first output feature maps by processing the multi-channel feature map through the pointwise convolution and the multi-channel second output feature maps by processing the multi-channel feature map through the non-pointwise convolution comprises:
    obtaining the multi-channel first output feature maps by performing the pointwise convolution on the multi-channel feature maps; and
    obtaining the multi-channel second output feature maps by performing the non-pointwise convolution on the multi-channel feature maps;
    wherein the fusing the multi-channel first output feature maps and the multi-channel second output feature maps to obtain the multi-channel third output feature map comprises:
        obtaining the multi-channel third output feature map by performing an accumulation operation on the multi-channel first output feature maps and the multi-channel second output feature maps.

3. The method of claim 1, wherein the multi-channel feature maps are divided into a first part of the multi-channel feature maps and a second part of the multi-channel feature maps by channel, and the obtaining the multi-channel first output feature maps by processing the multi-channel feature map through the pointwise convolution and the multi-channel second output feature maps by processing the multi-channel feature map through the non-pointwise convolution comprises:
    obtaining the multi-channel first output feature maps by performing the pointwise convolution on the first part of the multi-channel feature maps; and
    obtaining the multi-channel second output feature maps by performing the non-pointwise convolution on the second part of the multi-channel feature maps;
    wherein the fusing the multi-channel first output feature maps and the multi-channel second output feature maps to obtain the multi-channel third output feature map comprises:
        obtaining the multi-channel third output feature map by performing a channel reorganization on the multi-channel first output feature maps and the multi-channel second output feature maps.

* * * * *